UNITED STATES PATENT OFFICE.

ALBRECHT SCHMIDT AND ADOLF STEINDORFF, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MODE OF PREPARING FINELY-DIVIDED OR COLLOID INDIGO DYESTUFFS.

1,085,361.  Specification of Letters Patent.  Patented Jan. 27, 1914.

No Drawing.  Application filed May 17, 1911. Serial No. 627,759.

*To all whom it may concern:*

Be it known that we, ALBRECHT SCHMIDT, Ph. D., chemist, and ADOLF STEINDORFF, Ph. D., chemist, citizens of the Empire of Germany, residing at Höchst-on-the-Main, Germany, have invented certain new and useful Improvements in the Mode of Preparing Finely-Divided or Colloid Indigo Dyestuffs, of which the following is a specification.

In U. S. Letters Patent Numbers 1,058,019 and 1,058,020, granted April 1, 1913, to Albrecht Schmidt, assignor, there are described methods of producing a new colloid-like synthetic indigo, in the form of paste, powder or lumps, by liberating the indigo from indol derivatives and indigo salts, specifically leuco salts, in the presence of aromatic acids, such as sulfonic and carboxylic acids. We have now further found that aldehydes also act similarly to the aromatic sulfonic and carboxylic acids, and that not only aromatic aldehydes but also aldehydes of the fatty- and the terpene series are efficacious. Thus, for instance, m-oxybenzaldehyde, formaldehyde and the like produce a striking effect if added when the indigo is caused to form from its salts, including both the salts of the indigo itself and those of its reduced leuco form, *i. e.*, of indigo-white. Therefore by passing air into indigo-white salts in the presence of these aldehydes, or by decomposing indigo salts containing a mineral acid with water in the presence of the aldehydes, the indigo is obtained in extremely fine subdivision. Furthermore, an extremely finely-divided colloid-like indigo can be produced by starting from completely-finished formaldehyde-indigo-whites and treating them with air in presence of alkalis.

Example I: 100 parts by weight of an indigo vat of about 20% strength are introduced into 2000 parts of water while adding 60 parts of m-oxybenzaldehyde, or about 100 parts of a 40% solution of formaldehyde, and then immediately treated with air until the indigo has separated. The condensation product, which may form intermediately when formaldehyde is used, is, if it is formed at all so quickly, in any case decomposed immediately. The dyestuff thus obtained is extremely finely divided. It possesses properties similar to those of the product claimed in the specified Schmidt Patent No. 1,058,019 Ser. No. 576,703, filed August 11, 1910, but is distinguished by a more greenish-blue color, whereas the indigo obtainable according to said patent shows a pure blue shade. It is particularly easily reduced by slightly alkaline reducing agents, under which term we comprise for instance the cold glucose vat, the fermentation vat, and the like. With water, it gives a deep-blue, difficultly-depositing liquid paste, which, on being put on a filter, gives a blue filtrate, in which, when seen through the microscope, no more crystalline indigo-particles can be discerned.

Example II: 100 parts by weight of indigo are introduced into 600 parts of sulfuric acid of 60° while adding 20 parts of a solution of formaldehyde of 40% strength, or about 300 parts of m-oxybenzaldehyde. After having stirred the mass for a longer time it is poured on ice-water, filtered and washed.

Example III: 100 parts by weight of formaldehyde-indigo-white in the form of a paste are stirred in presence of air while adding 30 parts of caustic soda-lye of 40° Bé. and 2000 parts of water. The very finely-divided indigo thus separated is filtered and washed with water. It entirely resembles in its properties the products described in the foregoing Examples I and II. The substitution products of indigo; its analogues; also other indigoid dyestuffs and dyestuffs of the thioindigo-series, show a like behavior to the indigo.

Having now described our invention, what we claim is:

1. The process of manufacturing a new form of synthetic indigo bodies, which consists in subjecting indigo salts to indigo-producing conditions in the presence of aldehydes.

2. The process of manufacturing a new form of synthetic indigo bodies, which consists in subjecting indigo salts to indigo-producing conditions in the presence of formaldehyde.

3. The process of manufacturing a new form of synthetic indigo bodies, which consists in subjecting leuco indigo salts to oxidation in the presence of aldehydes.

4. The process of manufacturing a new form of synthetic indigo bodies, which consists in subjecting leuco indigo salts to oxidation in the presence of formaldehyde.

5. The process of manufacturing a new form of synthetic indigo bodies, which consists in oxidizing an alkaline solution of formaldehyde indigo-white salt with air.

6. As new products, synthetic indigo bodies in the new physical forms which are characterized by being easily reduced by slightly alkaline reducing agents, by showing a greenish-blue color, and by yielding, when made up into a paste with water, a deep-blue difficultly-depositing liquid paste which, on being put on a filter, gives a blue filtrate, in which, when seen through the microscope, no more crystalline indigo-particles can be discerned.

7. As new products, synthetic indigo bodies in the form of a paste, characterized by being easily reduced by slightly alkaline reducing agents, by showing a greenish-blue color, and by yielding, on being put on a filter, a blue filtrate, in which, when seen through the microscope, no more crystalline indigo-particles can be discerned.

In testimony whereof, we affix our signatures in presence of two witnesses.

ALBRECHT SCHMIDT.
ADOLF STEINDORFF.

Witnesses:
JEAN GRUND,
CARL GRUND.